United States Patent [19]

Gianzero

[11] Patent Number: 5,757,191

[45] Date of Patent: May 26, 1998

[54] VIRTUAL INDUCTION SONDE FOR STEERING TRANSMITTED AND RECEIVED SIGNALS

[75] Inventor: Stanley C. Gianzero, Austin, Tex.

[73] Assignee: Halliburton Energy Services, Inc., Houston, Tex.

[21] Appl. No.: 353,003

[22] Filed: Dec. 9, 1994

[51] Int. Cl.$^6$ ...................................................... G01V 3/28
[52] U.S. Cl. ............................................ 324/339; 324/343
[58] Field of Search ...................................... 324/338, 339, 324/343, 330, 334, 346, 232, 225

[56] References Cited

U.S. PATENT DOCUMENTS

| | | | |
|---|---|---|---|
| 3,510,757 | 5/1970 | Huston | 324/6 |
| 4,360,777 | 11/1982 | Segesman | 324/339 |
| 4,739,272 | 4/1988 | Griffin et al. | 324/339 |
| 4,980,643 | 12/1990 | Gianzero et al. | 234/339 |

OTHER PUBLICATIONS

The response of an induction dipmeter and standard induction tools to dipping beds, Stan Gianzero and Shey–Min Su; Geophysics, vol. 55, No. 9 (Sep. 1990); pp. 1128–1140.

Directional Induction Logging Methods; Motoyuki Sato, Jun Fuziwara, Makoto Miyairi, Koji Kashihara and Hiroaki Niitsuma; Dept. of Resources Engineering, Faculty of Engineering, Tohoku University, Sendai 980–77, Japan.

Beam Steering an Induction Sonde in Dipping Beds; Stan Gianzero; Sensor Modeling, Inc. Confidential Research Proposal, Oct. 10, 1994.

Beam Steering an Induction Sonde in Dipping Beds; Stan Gianzero; Sensor Modeling, Inc. Confidential Research Proposal, Oct. 24, 1994.

*Primary Examiner*—Walter E. Snow
*Attorney, Agent, or Firm*—Conley, Rose & Tayon, P.C

[57] ABSTRACT

An induction logging sonde is disclosed for detecting the resistive properties of formations traversed by a wellbore. The transmitting and receiving circuitry of the induction sonde comprises triads of orthogonally wound transmitters and receivers that are capable of being driven in such a fashion as to electrically rotate the coils to emulate coils that are either perpendicular or parallel to the bedding planes in a dipping formation. These rotations can be varied at any depth by using the information of the dip and strike angles obtained from a pulsed method of operation of the sonde. Once the dip angle and strike angles are ascertained, the electronic rotation is chosen to orient the coils parallel to the bedding planes, thereby producing logs which are devoid of horns, while at the same time producing regional dip and strike angles. In addition, the electronic rotation is also chosen to orient the coils perpendicular to the bedding planes to measure electrical anisotropy.

29 Claims, 8 Drawing Sheets

VIRTUAL INDUCTION SONDE FOR STEERING TRANSMITTED AND RECEIVED SIGNALS

BACKGROUND OF THE INVENTION

The present invention relates generally to an induction logging system for measuring characteristics of formations through which a wellbore has been drilled. More particularly, the present invention relates to an induction logging system which measures the angle of bedding formations and the angle at which the borehole intersects each formation bed. Still more particularly, the present invention relates to a high resolution induction logging system in which the transmitter and receiver arrays are steered to send and receive a directional induction beam that is parallel to the bedding formation.

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors. See generally J. Lab, *A Practical Introduction to Borehole Geophysics* (Society of Exploration Geophysicists 1986); D. R. Skinner, *Introduction to Petroleum Production*, Volume 1, at 54–63 (Gulf Publishing Co. 1981).

For a formation to contain petroleum, and for the formation to permit the petroleum to flow through it, the rock comprising the formation must have certain well known physical characteristics. One characteristic is that the formation has a certain measurable resistivity (or conductivity), which can be determined by inducing an alternating electromagnetic field into the formation by a transmitter coil arrangement. The electromagnetic field induces alternating electric (or eddy) currents in the formation in paths that are substantially coaxial with the transmitter. These currents in turn create a secondary electromagnetic field in the medium, inducing an alternating voltage at the receiver coil. If the current in the transmitter coil is kept constant, the eddy current intensity is proportional to the conductivity of the formation. Consequently, the conductivity of the formation determines the intensity of the secondary electromagnetic field, and thus, the amplitude of the voltage at the receiver coil. As will be apparent to one skilled in the art, the propagating electromagnetic wave suffers both attenuation and phase shift as it traverses the formation. See generally, James R. Jordan, et al., *Well Logging II—Electric And Acoustic Logging*, SPE Monograph Series, Volume 10, at 71–87 (1986).

An exemplary induction tool is shown in the prior art drawing of FIG. 1, in which one or more transmitters (T) and a plurality of receivers ($R_i$) are shown in a logging sonde. An oscillator supplies alternating current to the transmitter coils, thereby inducing current in the receiver coils that is measured, processed and sent to the surface of the well for recording. The voltage induced in the receiver coils results from the sum of all eddy currents induced in the surrounding formations by all transmitters. Typically, phase sensitive detectors are used to measure that component of the receiver voltage which is in-phase with the transmitter current.

As noted, the induced eddy currents tend to flow in circular paths that are coaxial with the transmitter coil. As shown in FIG. 1, for a vertical borehole traversing horizontal formations, there is a general symmetry for the induced current around the logging tool. In this ideal situation, each line of current flow remains in the same formation along its entire flow path, and never crosses a bed boundary.

In many situations, as shown for example in FIG. 2, the wellbore is not vertical and the bed boundaries are not horizontal. The well bore in FIG. 2 is shown with an inclination angle θ measured relative to true vertical. A bed boundary between formations is shown with a dip angle α. The inclined wellbore strikes the dipping bed at an angle β. As a result, the induced eddy currents flow through more than one media, encountering formations with different resistive properties. The resulting logs tend to be relatively inaccurate, especially as the dip angle α of the bed boundaries become more severe. If the logging tool traverses a thin bed, the problem becomes even more exaggerated.

As shown in the graph of FIG. 3A, an induction sonde traversing a dipping bed produces a log with "horns". The more severe the dip angle, the less accurate is the measurement with depth. FIG. 3A represents a computer simulation of a log that would be generated during logging of a ten foot thick bed (in actual depth), with different plots for different dip angles. FIG. 3B shows a computer simulation of a log which would be generated if the thickness of the bed was true vertical depth, with different plots for different dip angles. FIG. 3C depicts a high resolution log obtained from a high resolution logging tool, such as that made by the assignee of the present invention, which would be obtained when logging through a ten foot bed, with different plots for different dip angles. FIG. 4D is a similar plot of a high resolution device measured in true vertical depth. As is evident from each of these simulated logs, as the dip angle increases, the accuracy and meaningfulness of the log decreases. In instances of high dip angles, the plots become virtually meaningless in the vicinity of the bed boundaries.

In an attempt to increase the accuracy of logs in dipping beds, various devices have been developed to measure the dip angle of bed boundaries to give more meaning to the logs. See U.S. Pat. No. 4,360,777, and Gianzero, S. and Su, S. M., "The Response of an Induction Dipmeter and Standard Induction Tool to Dipping Beds," *Geophysics*, Vol. 55, No. 9 (Sep. 1990). Similarly, other devices have been developed to measure the strike angle between the wellbore and the bed boundary. Although there are a number of commercially available micro-resistivity devices which measure strike and dip angles on the scale of inches, no devices have yet been developed which measures both strike and dip angles on the scale of several feet (i.e. a regional dipmeter).

In addition, all of the foregoing devices are intended to be used in conjunction with the logs to assist in interpreting the logs. Thus, these prior art devices concentrate on the interpretation of the induction tool, which requires a great deal of processing to extract meaningful data.

It would be advantageous if a logging tool could be developed which measures both dip and strike angle. It would be further advantageous to develop an induction sonde which steers the induced eddy currents in a path that is parallel to the bed boundaries, regardless of the bed's dip angle, in order to obtain a resistivity log that principally measures only one formation layer at a time.

Despite the apparent advantages of such a system, to date no such device has been developed.

SUMMARY OF THE INVENTION

The present invention solves the shortcomings and deficiencies of the prior art by implementing an induction logging system that measures dip angle of bed boundaries and strike angle of the wellbore through the bed boundary, and which uses this information to selectively steer the induced eddy currents in a direction parallel to the bed boundary. As a result, the resistivity of each formation layer can be measured rather independently for more accurate resistivity and depth logs after drilling. In addition, the voltage signals received by the receivers also can be processed to remove extraneous signals from all but the desired direction.

The induction sonde includes orthogonally wound triads of transmitter and receiver coils that are rotated electrically to create a virtual sonde in which the transmitted and received signals are steered in a direction parallel to the bedding plane, regardless of the dip angle of the bed or the strike angle of the wellbore with respect to the bed.

The transmitter and receiver arrays preferably comprise triads of coils that are wound orthogonally in three independent directions to define a coordinate system for the sonde. The steering is accomplished by first measuring a long time transient response of a pulsed mode of operation of the sonde. After the dip angle α and strike angle β are determined, the coils are rotated electrically to coincide the sonde coordinate system with the coordinate system of the bedding plane and the remaining measurements are made in a continuous wave (CW) mode. This rotation preferably is performed in two steps. First, the coordinate system is rotated about the z axis by the strike angle β. Next, the coordinate system is rotated about its y axis by the dip angle α causing it to coincide with the coordinate systems of the bedding plane.

The logging system includes processing circuitry coupled to each coil of the transmitter and receiver arrays. Initially, to determine dip and strike angles α and β, the sonde or a subassembly of the sonde is excited by a short pulse (see U.S. Pat. No. 4,849,699) and the long time (i.e. microseconds) response of selected transmitter and receiver pairs is recorded according to the manner specified in U.S. Pat. No. 5,115,198.

Once the strike angle β and dip angle α are determined, the transmitter and receiver coils are rotated electrically by the strike and dip angles to emulate coils that are parallel or perpendicular to the bedding plane. The remaining measurements for conductivity are performed at a single frequency or equivalently in the CW mode.

BRIEF DESCRIPTION OF THE DRAWINGS

For a more detailed description of the preferred embodiment of the present invention, reference will now be made to the accompanying drawings, wherein.

During the course of the following description, the terms "above" and "below" are used to denote the relative position of certain components with respect to the direction of flow of the drilling mud. Thus, where a term is described as above another, it is intended to mean that drilling mud flows first through the first component before flowing through the second component. Thus, these and other terms are used to identify the relative position of components in the bottom-hole assembly, with respect to the distance to the surface of the well, measured along the wellbore path.

DETAILED DESCRIPTION OF THE PREFERRED EMBODIMENT

Figure 4:
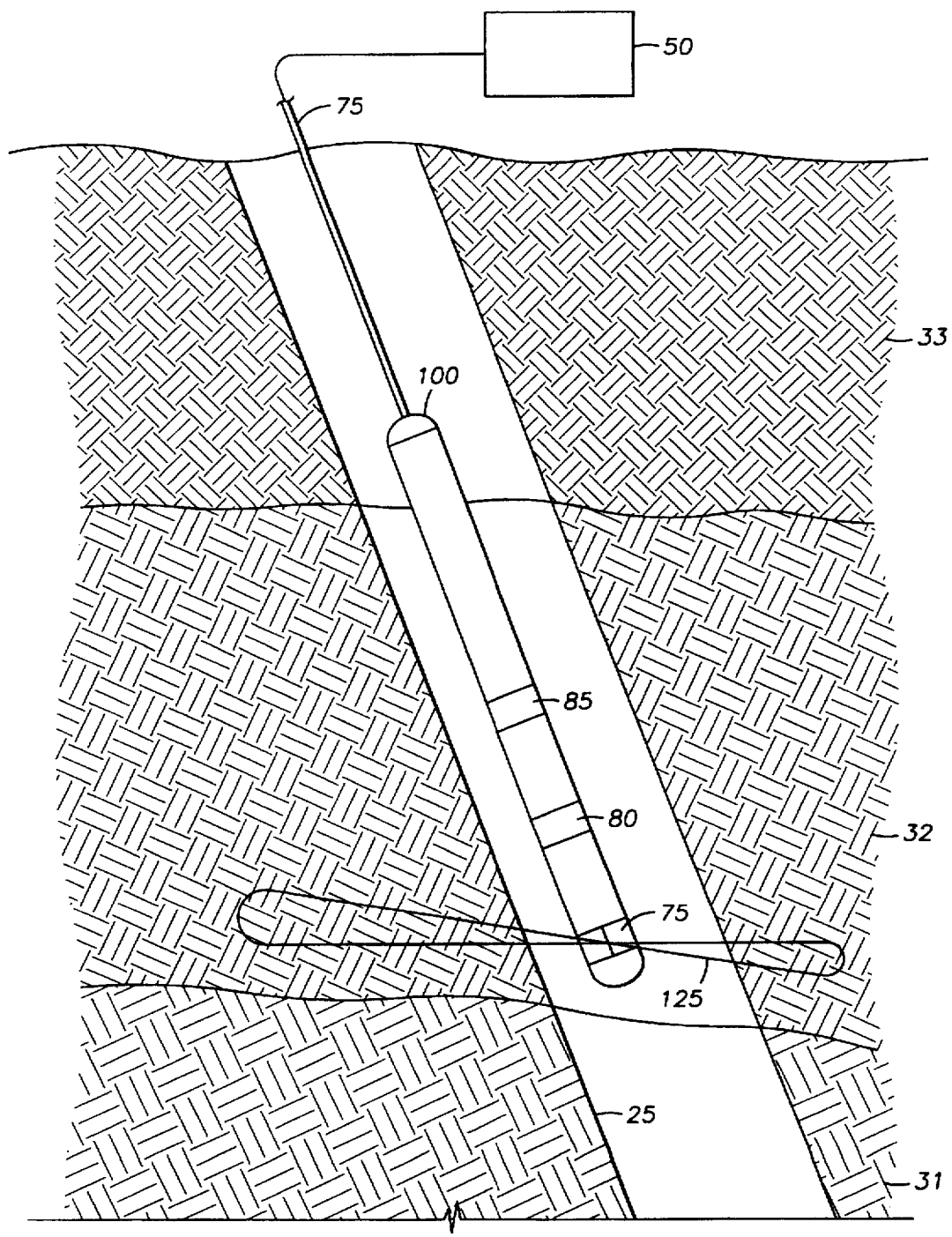
FIG. 4 is a block diagram illustration depicting the basic construction of the present invention.

Referring initially to FIG. 4, an induction logging sonde 100 is shown constructed in accordance with the preferred embodiment. The induction sonde 100 is lowered into a wellbore 25 via wireline 70. As shown in FIG. 4, the wellbore 25 traverses through a plurality of downhole formations, illustrated as formations 31, 32 and 33. As one skilled in the art will understand, numerous formations may be encountered during the drilling of a wellbore, and thus FIG. 4 is merely meant to be exemplary. Each formation may have different characteristics and properties that increase or decrease the likelihood of recovering hydrocarbons from that formation. The area where formations intersect commonly is referred to as a bed boundary.

As shown in FIG. 4, the logging sonde 100 connects electrically to electrical components 50 on the surface via a wireline 70. The logging sonde preferably includes one or more transmitters 75 for inducing and steering eddy currents (indicated by directional beam 125) in a direction that is parallel to the bed boundary defined by formations 31, 32. One or more receiver arrays 80, 85 also are preferably included in the induction sonde 100 for receiving an alternating voltage induced by the secondary electromagnetic field (which are caused by the eddy currents). In accordance with the preferred embodiment, the alternating voltage signals received by receivers 80, 85 are processed to eliminate all signals other than those that are aligned parallel to the bed boundary.

Figure 7:
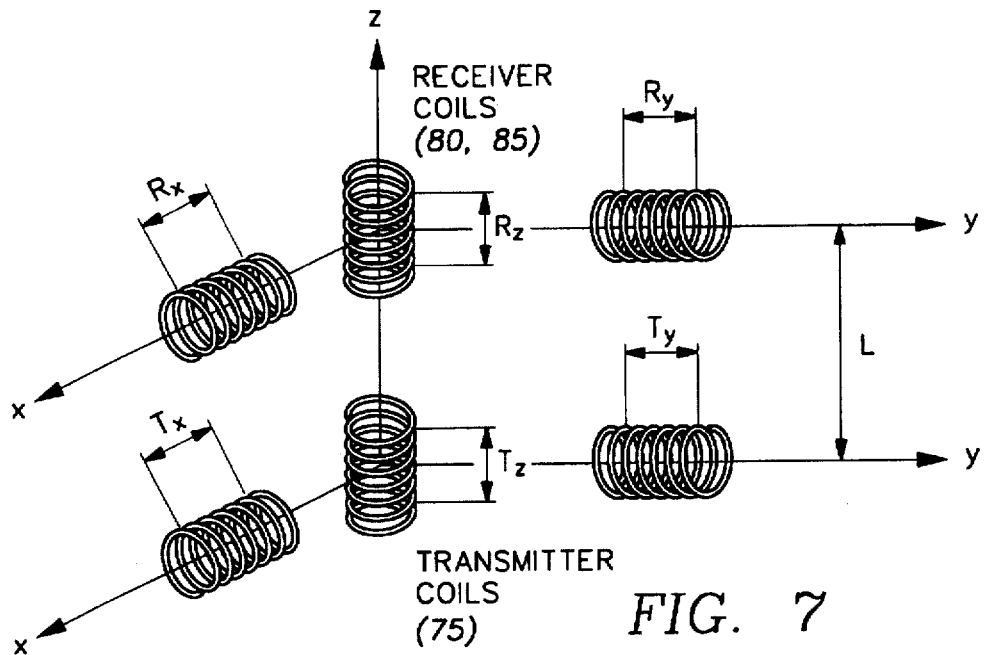
FIG. 7 is an illustration of a three dimension coil array for use as the transmitter and receiver devices of the preferred embodiment.
Figure 8:
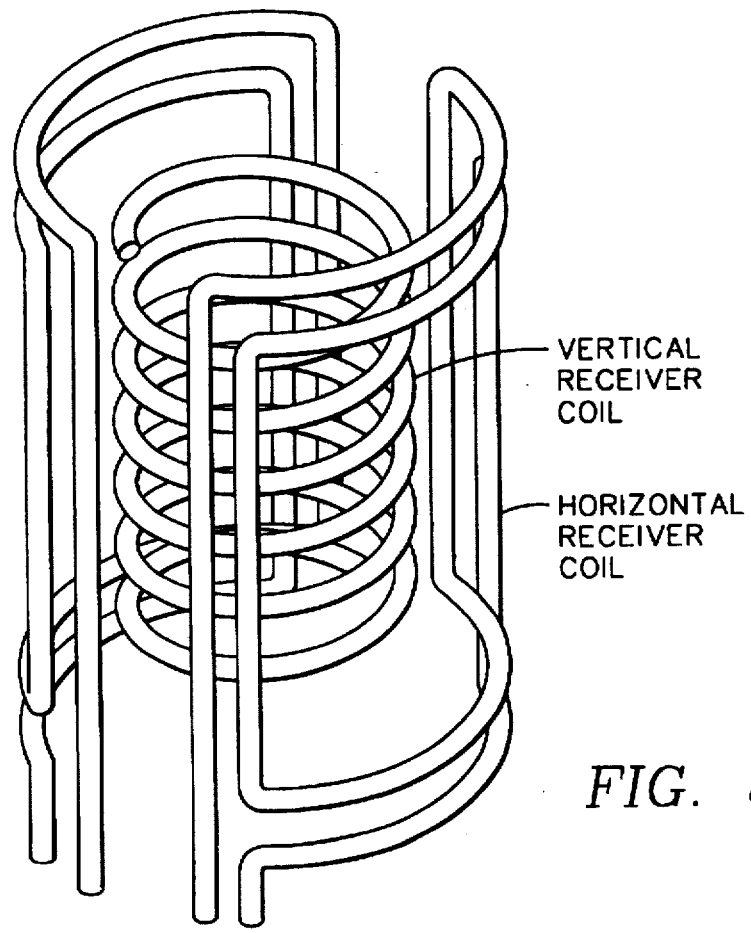
FIG. 8 is an illustration of an alternative coil arrangement for the transmitter and receiver coils.

The steered beams preferably are obtained by electrically rotating the transmitter (and receiver) arrays to only induce currents that are parallel to the bed boundaries, regardless of the dip angle $\alpha$. More specifically, the transmitter (and receiver) array is energized in such a fashion to produce a transverse electric (TE) mode to induce eddy current loops parallel to the bed boundary, while avoiding the transverse magnetic (TM) mode, which otherwise would produce a vertical loop component that intersects more than one formation. As best seen in FIG. 7, the coil array constructed in accordance with the preferred embodiment (preferably for both transmitters 75 and receivers 80, 85) comprises triads of coils that are wound orthogonally in three independent directions, which are represented in FIG. 7 as the three directions in the cartesian coordinate system, x, y, and z. Additional details regarding the preferred construction of the coil arrays is found in U.S. Pat. No. 4,980,643, the teachings of which are incorporated by reference herein. An alternative method of constructing the transmitter and receiver arrays is shown in FIG. 8. In FIG. 8, a two coil system is shown with a horizontal ($T_x$ or $R_x$) coil and a vertical ($T_y$ or $R_y$) coil. A third orthogonal ($T_z$ or $R_z$) coil could be added if desired by one skilled in the art.

Figure 3A:
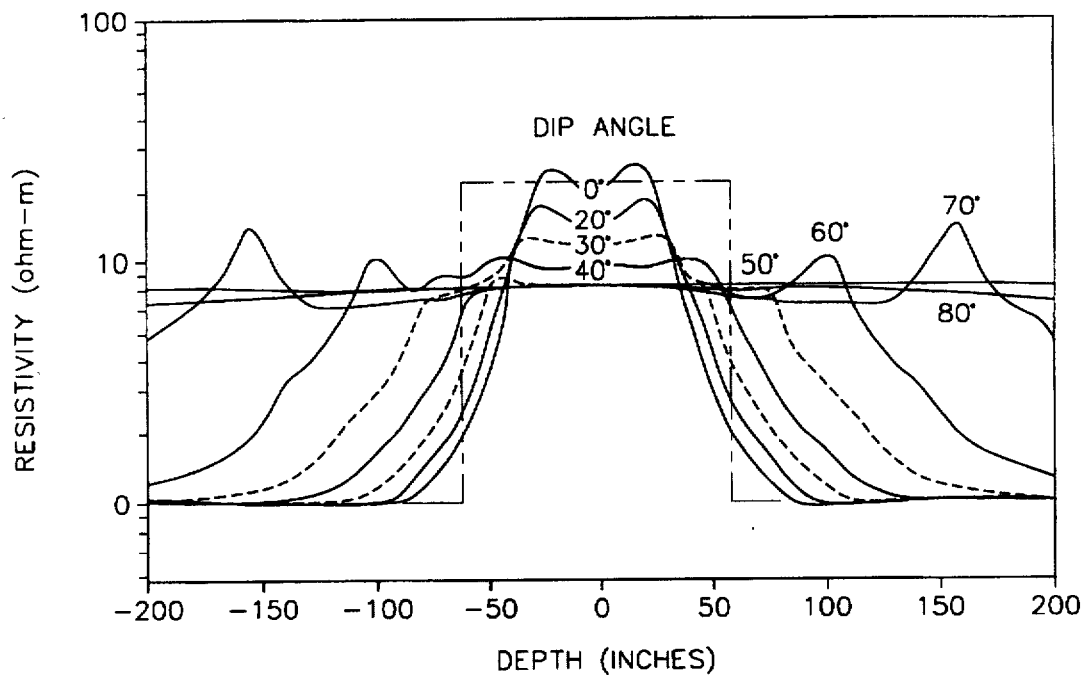
FIGS. 3A-3D depict resistivity logs obtained in dipping bed formations using the induction sonde of FIG. 1.
Figure 3B:
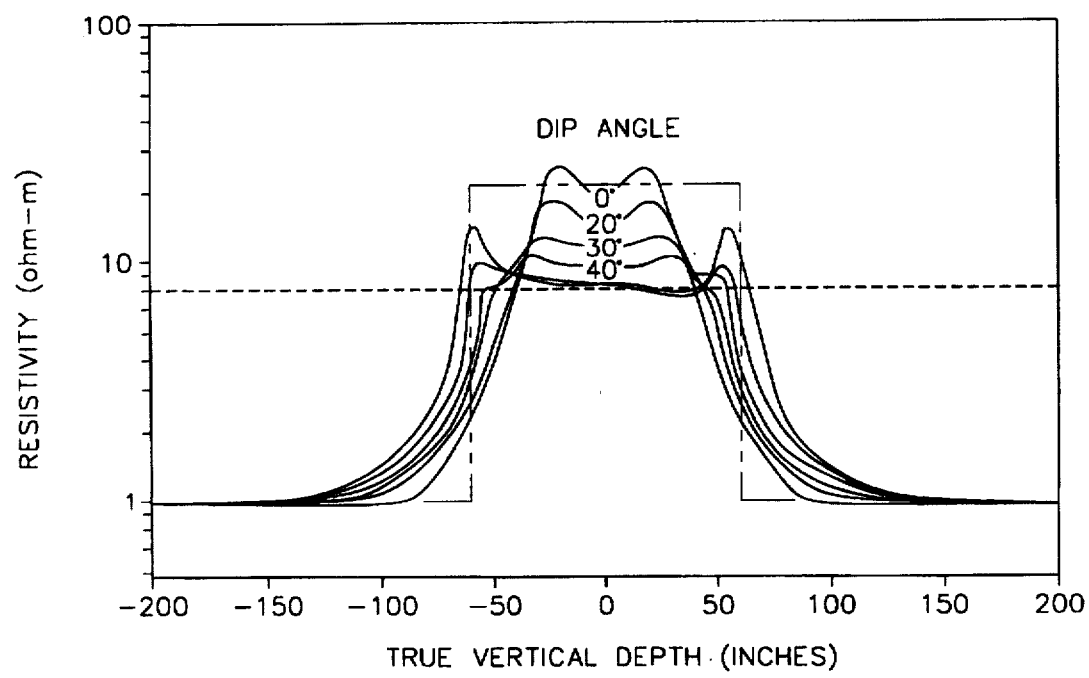
Figure 3C:
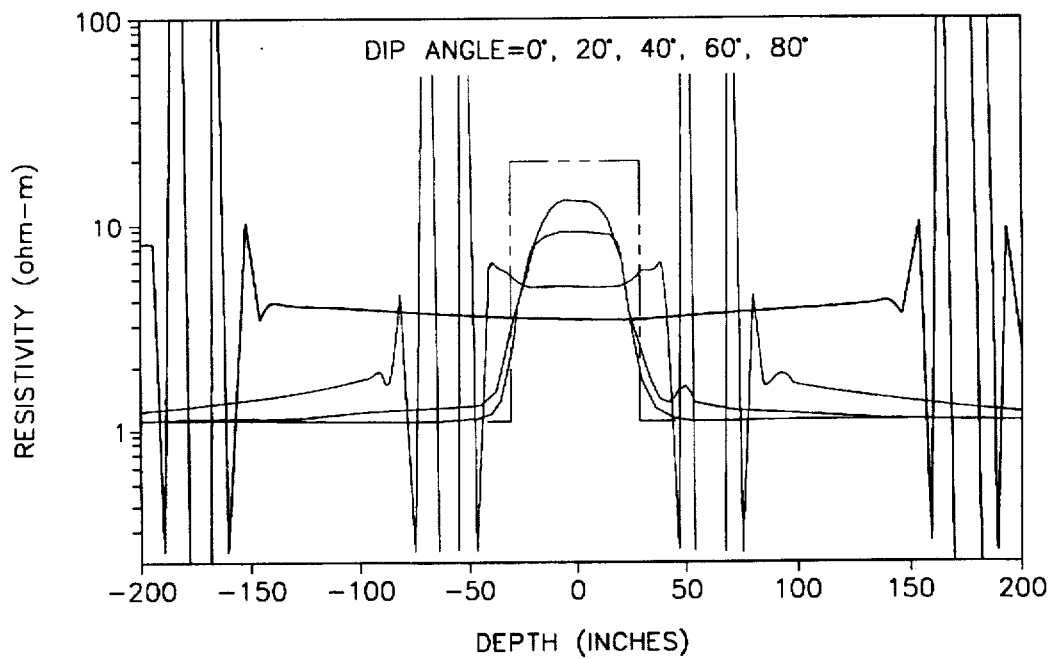
Figure 3D:
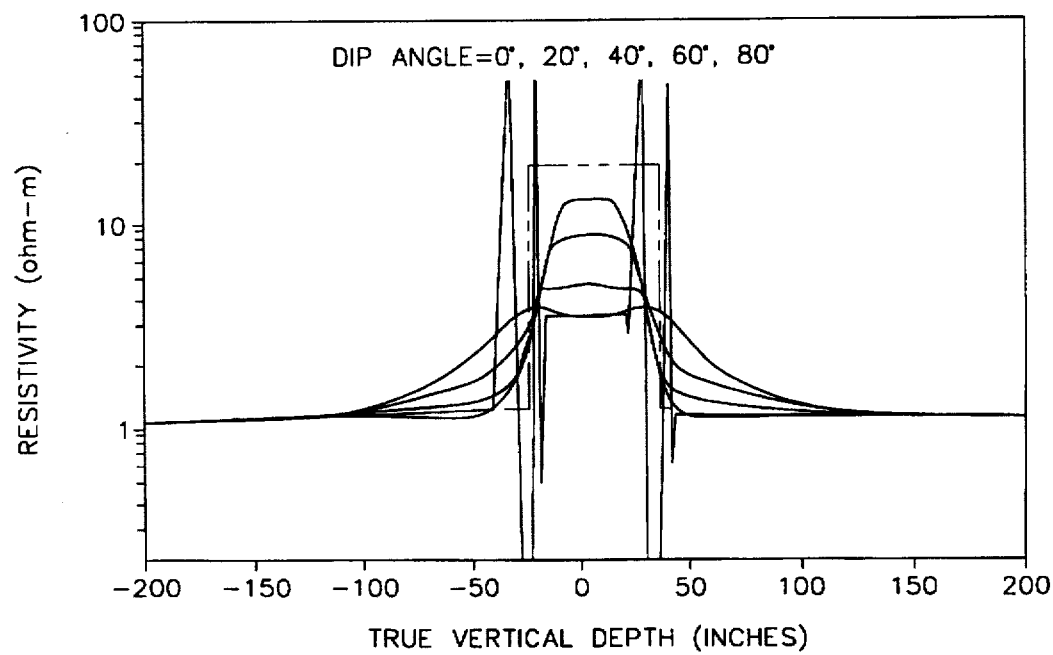
Figure 3E:
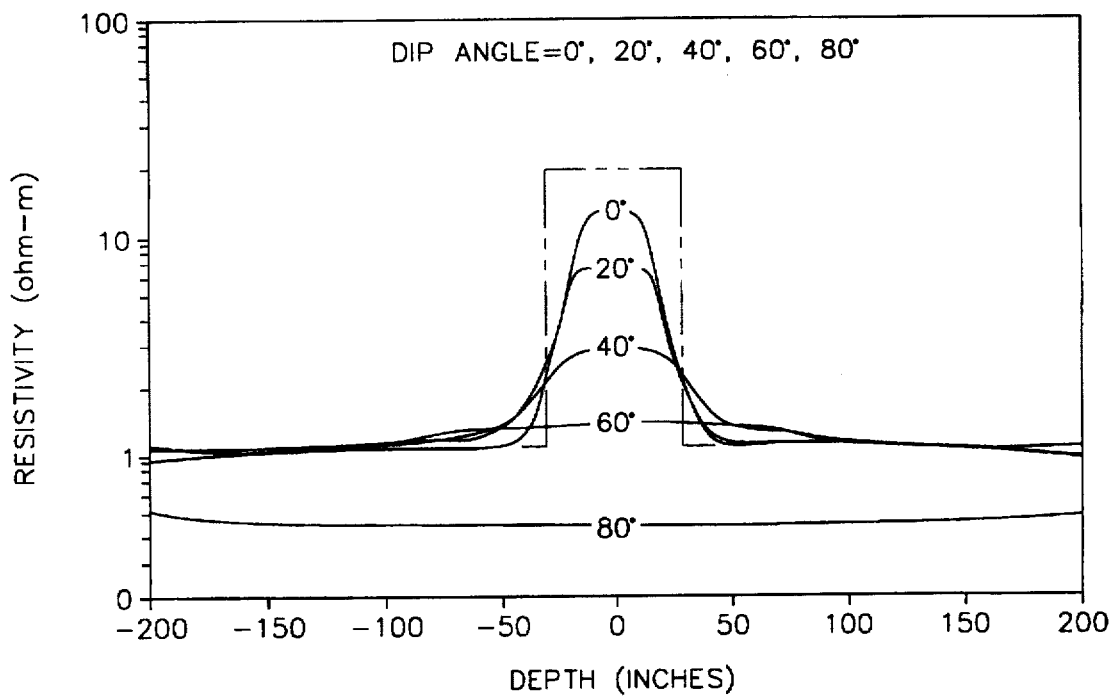
FIGS. 3E-3F depict resistivity logs obtained with the virtual sonde of the preferred embodiment.
Figure 3F:
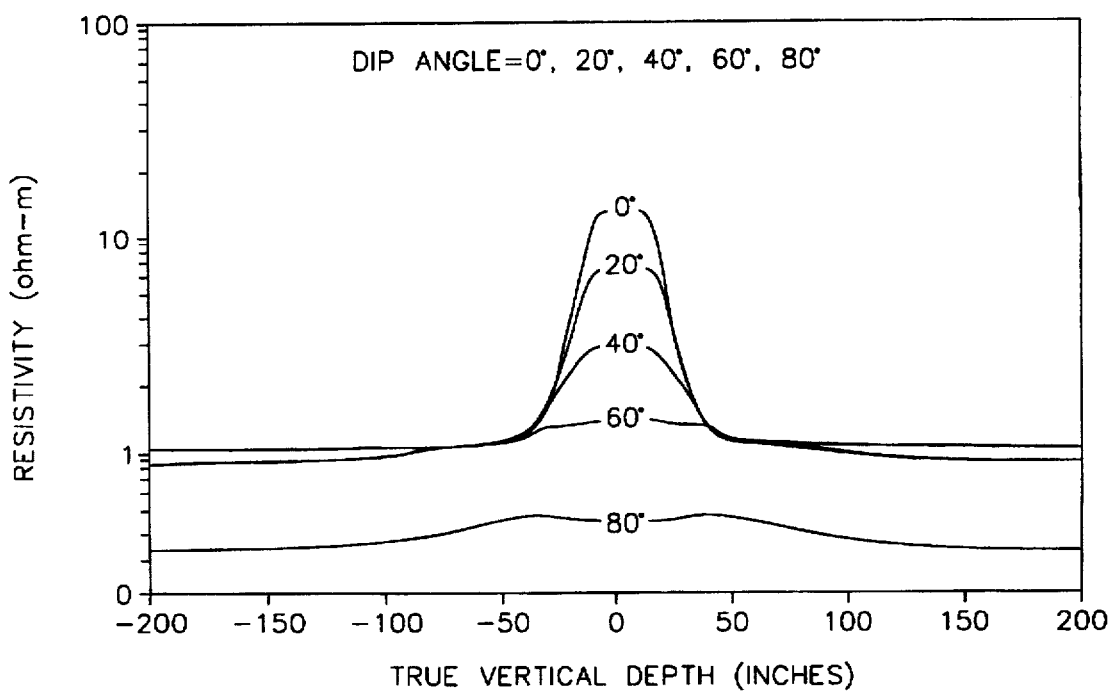
Figure 5:
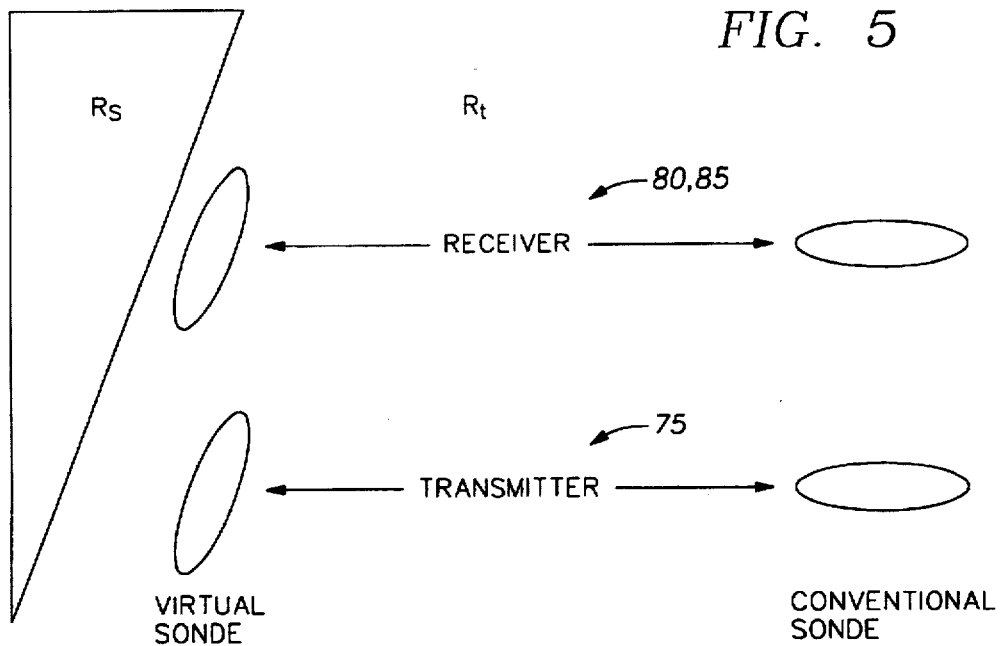
FIG. 5 illustrates the concept of rotating the transmitter and receiver structures in accordance with the preferred embodiment.

In accordance with the preferred embodiment, and as shown in FIG. 5, the present invention drives the transmitter and receiver arrays in such a fashion as to create a virtual sonde, with the virtual coil arrays parallel to the bed boundaries to produce magnetic moments that are orthogonal to the bed boundaries. FIG. 5 also demonstrates the effect which would result if a conventional sonde were used instead of the virtual sonde of the present invention. If a conventional sonde were used, the logs depicted in FIGS. 3A-3D would result, instead of the logs of FIGS. 3E and 3F obtained with the implementation of the virtual sonde. Referring to FIGS. 3E and 3F, the present invention provides a log which provides accurate data regardless of the dip angle of the bedding formation, without the horns that typically are detected in prior art induction sondes.

Figure 1:
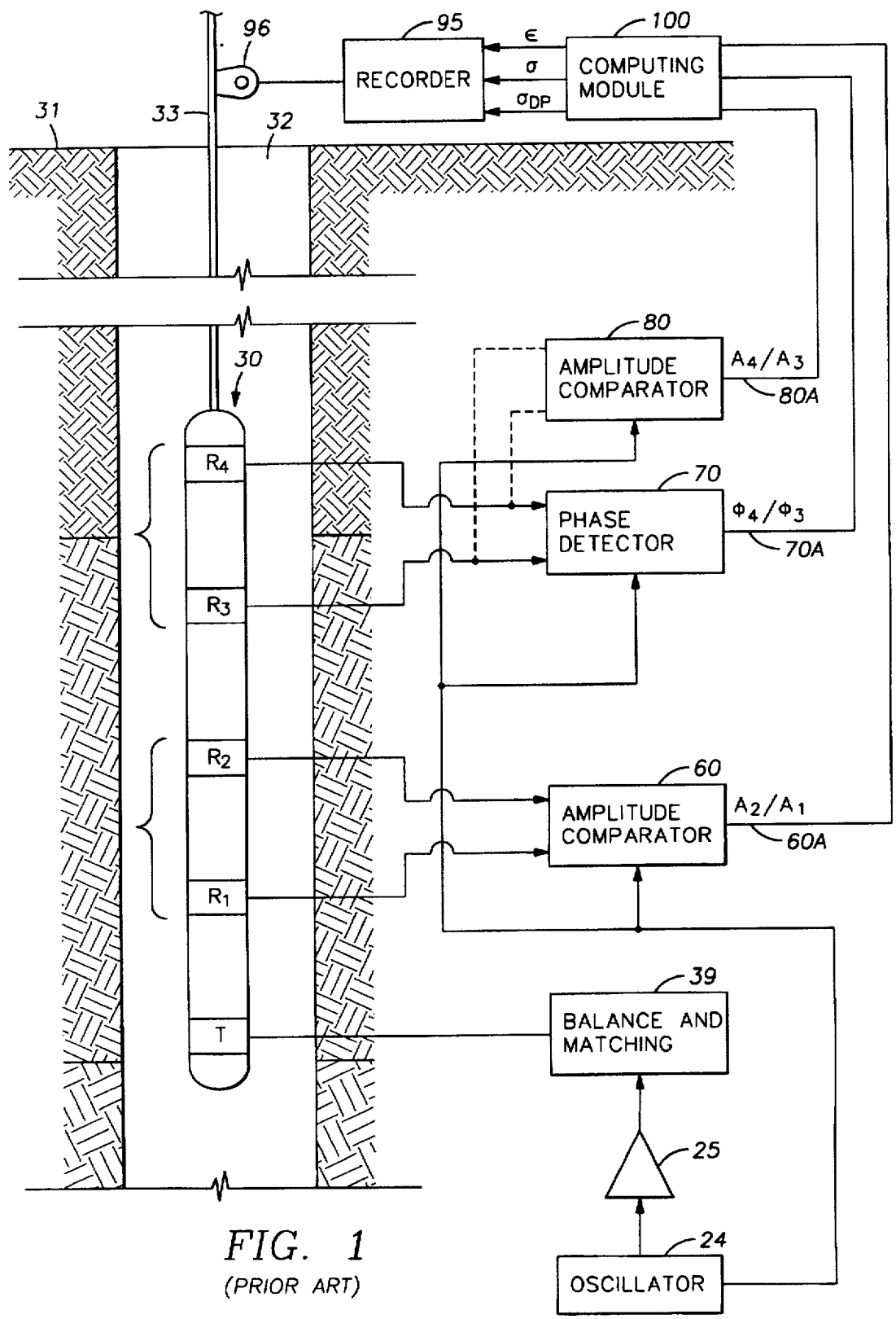
FIG. 1 is an illustration of a prior art induction logging system.
Figure 2:
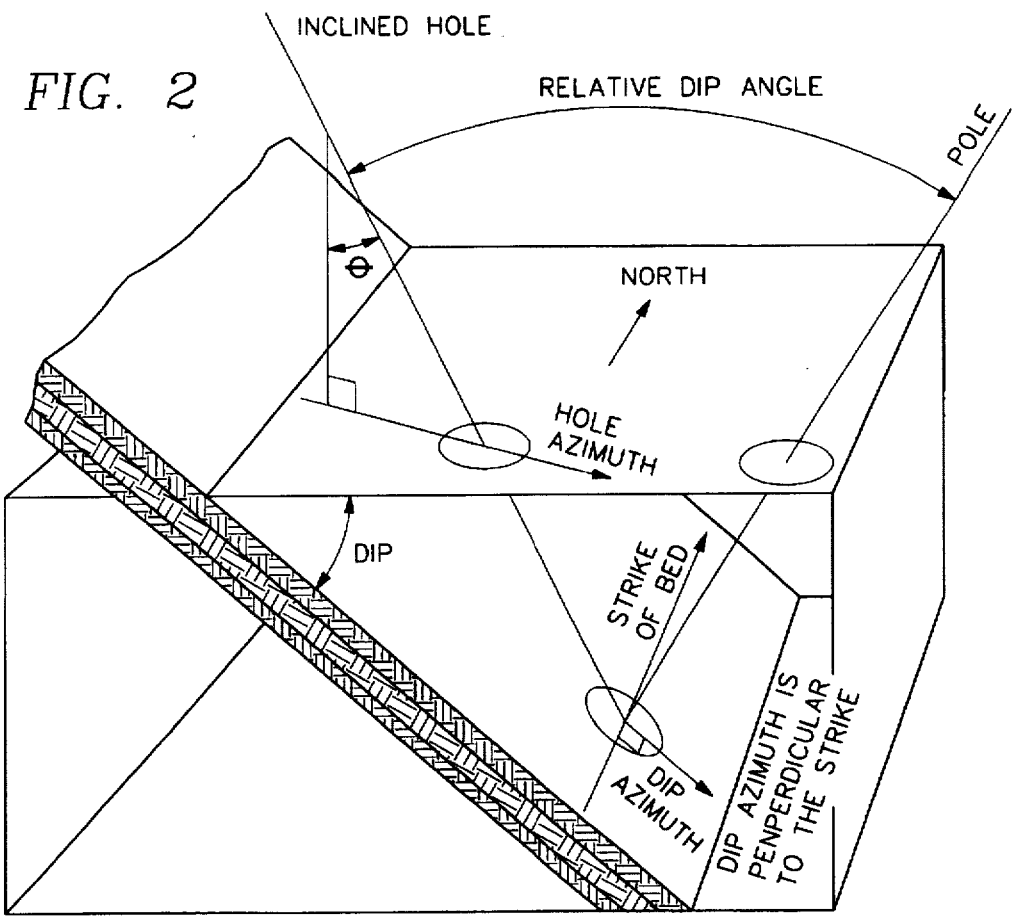
FIG. 2 is an illustration of a wellbore being drilled through a dipping bed formation in accordance with typical drilling practices.

The direction in which to steer the transmitter and receiver arrays is determined by first measuring the dip angle $\alpha$ of the bed boundary and strike angle $\beta$ at which the borehole 25 traverses the boundary (FIGS. 2 and 4). The ability to steer the transmitter array 75 and receiver arrays 80, 85 therefore hinges on the ability of the system to determine these angles. These angles are determined real-time by the preferred embodiment of the present invention, as set forth in more detail below.

Figure 6:
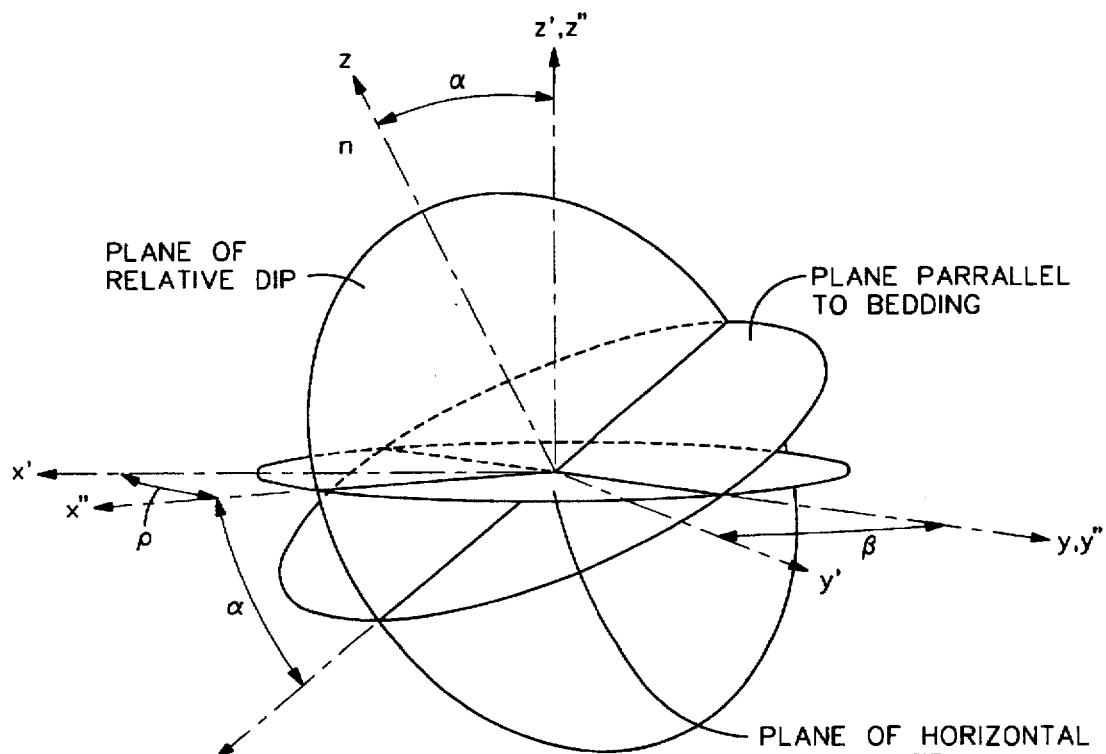
FIG. 6 illustrates the preferred method of rotating the transmitter and receiver devices.

In order to eliminate the horns in the logs, the present invention electrically rotates the transmitter and receiver arrays by the dip angle $\alpha$ and the strike angle $\beta$ to produce the eddy current parallel to the bed boundary. Referring to FIG. 6, the preferred method of rotating the coordinate system associated with the sonde to coincide with the coordinate system of the bed boundary will now be described. The coordinate system of the formation or bedding is shown as the x, y, z coordinate system, while the coordinate system of the sonde is depicted as the x', y', z' coordinate system. The first step in the preferred embodiment is to rotate the x', y', z' coordinate system (which represents the sonde coordinate system) about the z' axis an angle $\beta$. The angle $\beta$ represents the strike angle. Thus, in the first step, the sonde coordinate system is rotated about the z' axis by the strike angle $\beta$. The resulting coordinate system defined by this rotation is represented in FIG. 6 by the x", y", z" system. The next step is to rotate the x", y", z" coordinate system by an angle $\alpha$ (representing the dip angle) through the y" axis. The resulting coordinate system is the original x, y, z system defining the formation boundary. Thus, the sonde coordinate system is aligned with the bed coordinate system by a first rotation through the strike angle $\alpha$, and by a second rotation through the dip angle $\beta$.

The manner in which the transmitter and receiver arrays are rotated is defined by the rotational matrix R, which relates the coordinate system of the induction sonde with the natural coordinate system of the beds. The rotational matrix R is the product of the two rotational matrices which describe the previous rotations:

$$R = \begin{pmatrix} \cos\alpha & 0 & -\sin\alpha \\ 0 & 1 & 0 \\ \sin\alpha & 0 & \cos\alpha \end{pmatrix} \begin{pmatrix} \cos\beta & \sin\beta & 0 \\ -\sin\beta & \cos\beta & 0 \\ 0 & 0 & 1 \end{pmatrix} = \tag{1}$$

$$\begin{pmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{pmatrix}$$

Upon rotation of the sonde system by the rotation matrix R, the magnetic moments M of the bedding system equal the magnetic moments M' of the sonde system, as follows:

$$M = RM' \tag{2}$$

where, the magnetic moment M of the bedding system is defined in the cartesian coordinate system as:

$$M = \begin{pmatrix} M_x \\ M_y \\ M_z \end{pmatrix} \tag{3}$$

and, the magnetic moment M' of the sonde system is defined in the cartesian coordinate system as:

$$M' = \begin{pmatrix} M_x' \\ M_y' \\ M_z' \end{pmatrix} \tag{4}$$

Using a conventional coil array in the sonde system with a magnetic moment $M_z' = M$, produces in the bedding system the following magnetic moment components:

$$M_x = -M \sin\alpha, \tag{5}$$
$$M_y = 0,$$
$$M_z = M \cos\alpha.$$

The primary question becomes how the induced magnetic fields H detected by the receiver coils 80, 85 are coupled to the magnetic moments M of the transmitter coils 75 due to the presence of the dipping bed formations. Put in more general terms, how do the $T_x$, $T_y$, and $T_z$ components of the transmitted signal couple to the received components $R_x$, $R_y$, and $R_z$.

The manner in which the induced magnetic fields H couple to the magnetic moments M of the transmitter coils can be describe mathematically as:

$$H = CM \tag{6}$$

where the coupling matrix C in the bedding system, for finite-spacing between the transmitter and receiver coil arrays, produces a non-full matrix, which is described as:

$$C = \begin{pmatrix} C_{xx} & 0 & C_{xz} \\ 0 & C_{yy} & 0 \\ C_{zx} & 0 & C_{zz} \end{pmatrix} \tag{7}$$

The coupling for the sonde or coil system is given as:

$$H' = C'M' \tag{8}$$

where the coupling matrix C' in the sonde system is related to the coupling matrix C in the bedding system through the rotation matrix R, as follows:

$$C' = R^{-1}CR \tag{9}$$

Thus, the coupling at the sonde system can be written as:

$$H' = R^{-1}CRM' \tag{10}$$

If the dip angle $\alpha$ and strike angle $\beta$ are known, the transmitter triad array can be made to appear as a single transmitter with a magnetic moment that is orthogonal to the bedding plane in the bedding system of coordinates. This is done, in accordance with the preferred embodiment, by driving the transmitter coils with the inverse rotation matrix $(R^{-1})$ such that the moments in the bedding system are defined as:

$$M = RR^{-1}M' = M' \tag{11}$$

and select M' as:

$$M' = \begin{pmatrix} 0 \\ 0 \\ M \end{pmatrix} \tag{12}$$

In the receiver circuitry, the signals received by the receiver coil triad arrays preferably is conditioned with the rotation matrix R itself:

$$RH' = RR^{-1}CM' = CM' \tag{13}$$

where M' is described in Equation (12), and $$H = RH' \tag{14}$$

Although the magnetic fields H in the receiver coils contain both $H_x$ and $H_z$ components, only the $H_z$ component of the signal is retained in the receiver circuitry after the signal has been conditioned to account for the fact that the transmitters and receivers of the virtual sonde are misoriented relative to a conventional sonde. This misorientation, which is shown in FIG. 5, arises because the magnetic moments of the transmitter and receiver are not exactly aligned. The reason that the magnetic moments are not exactly aligned is that the virtual transmitters and virtual receivers are rotated to align in parallel with the adjacent bed boundary. Because spacing exists between the transmitters and receivers, the transmitters and receivers may be rotated differently to properly align with the bed boundary.

Thus, in the preferred embodiment, the transmitter array 75 is driven in a direction defined by the inverse rotation matrix $(R^{-1})$, while the received response is preferably conditioned by the rotation matrix (R). The rotation matrix (R) is set forth in Equation (1). In addition, the coupling factor between finite coils is different for different orientations and must be accounted for, as discussed in W. R. Symthe, *Static and Dynamic Electricity*, (McGraw Hill 1939) at p. 310. The above discussion has assumed a knowledge of the dip angle $\alpha$ and the strike angle $\beta$. The dip angle $\alpha$ and strike angle are determined in accordance with the preferred embodiment by first pulsing $T_z$ and measuring the coupling with $R_x$ and $R_y$, and then pulsing $T_x$ and measuring the coupling with $R_y$. The strike and dip angles are obtained from the following simple algorithms.

$$\beta = \tan^{-1} = \frac{(T_zR_y)}{(T_zR_x)} \tag{15}$$

$$\alpha = \tan^{-1}\sqrt{\left[\frac{(T_zR_y)}{(T_xR_y)}\right]^2 + \left[\frac{(T_zR_y)}{(T_zR_x)}\right]^2} \tag{16}$$

The algorithm for the determination of the strike angle $\beta$ is an exact result which not only applies for all times in the pulsed mode but also applies equally well in the CW mode. This is advantageous because the strike angle changes frequently as the tool rotates, whereas the dip angle $\alpha$ tends to change less frequently. Consequently, the sonde is pulsed mainly to determine the dip angle $\alpha$ and need not be pulsed at every logging station. The strike angle $\beta$ is measured at every logging station in the CW mode and provides a quality assurance check on its own measurement in the pulsed mode. Thus, from the foregoing discussion, the strike angle and the dip angle can be determined in accordance with the preferred embodiment, and used to electrically rotate the transmitter and receiver coil arrays to be parallel to the bedding planes to create a virtual sonde as shown in FIG. 5.

Figure 9:
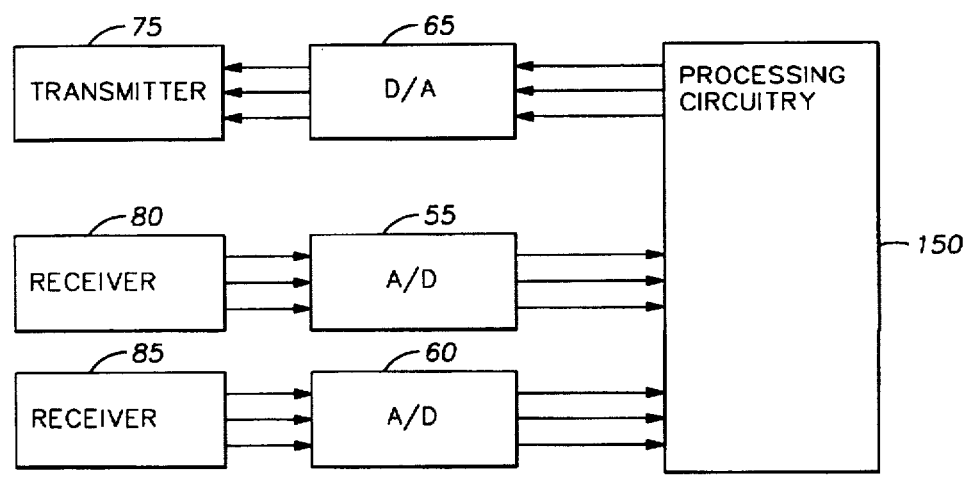
FIG. 9 shows a block diagram of an embodiment for exciting the transmitter array and processing the receiver array according to the preferred embodiment.

FIG. 9 shows one embodiment for producing a steered beam. As shown in FIG. 9, each of the coils in the triad array couples separately to processing circuitry 150, after the signals are converted from analog to digital signals by A/D converters 55, 60. The processing circuitry 150, once the dip angle $\alpha$ and the strike angle $\beta$ are determined, provides proper weights to each of the signals received from the receiver arrays 80, 85 to steer or focus the received signal to align in parallel to the bed boundaries, as discussed above.

Each of the triad of coils comprising the transmitter couples to the processing circuitry 150 via a digital-to-analog (or D/A) converter 65. The processing circuitry 150 provides digital output signals on each of the coil connections to phase or weight the individual orthogonally wound coils comprising the transmitter array 75 to produce a directional or steered induction current in the formation, as described above. Other methods for electronically steering the beams to produce directional eddy currents in the formation may also be used without departing from the principles of the present invention.

While a preferred embodiment of the invention has been shown and described, modifications thereof can be made by one skilled in the art without departing from the spirit of the invention. In fact, in certain situations, it is advantageous to orient the magnetic moments of the transmitters and receivers to be parallel to the bed boundaries. In particular, if the beds are extremely thin relative to the resolution of the tool, as in laminated shale-sand sequences, the layers appear as a uniform, homogeneous, anisotropic formation. In this case, the leading term that describes the signal without skin effect for a parallel orientation of the coils is a measure of the so-called vertical conductivity. The utilization of this signal to determine shale-sand content is well documented (Hagiwara, T., "Response of 2 MHz Resistivity Devices in Thinly Laminated Formations (Anisotropy Resistivity and EM Log Interpretation)," 69th Annual Technical Conference, SPE, 1994, paper SPE #28426).

I claim:

1. An induction logging system for measuring characteristics of formations through which a wellbore has been drilled by inducing eddy currents in a formation, comprising:
   a logging sonde, including a transmitter array for transmitting signals and a receiver array for receiving signals;
   wherein said transmitter and said receiver array each comprises a plurality of coils;
   processing circuitry configured to transmit processing signals, said processing circuitry coupled to each coil in said transmitter array and to each coil in said receiver array;
   wherein said processing circuitry determines a dip angle I for said formations and a strike angle β at which the wellbore intersects the formation based upon said signals transmitted by said transmitter array and said signals received by said receiver array, said processing circuitry applying said processing signals to each of said transmitter coils to steer said eddy currents in a path based upon said dip angle I and said strike angle β.

2. A system as in claim 1, wherein said processing circuitry applies signals to each of said transmitter coils to steer said eddy currents in a path that is parallel to a formation boundary and further wherein said processing circuitry receives signals from each of said receiver coils indicative of the receiver response and processes said signals to steer the receiver response in a direction parallel to a formation boundary.

3. A system as in claim 1, wherein said processing circuitry applies signals to each of said transmitter coils to steer the eddy currents in a path that is perpendicular to a formation boundry based upon the dip angle α and strike angle β.

4. A system as in claim 1, wherein said processing circuitry receives signals from each of said receiver coils indicative of the receiver response and processes said signals to steer the receiver response in a direction perpendicular to the formation boundary.

5. A system as in claim 1, wherein said receiver array comprises an orthogonally wound triad of coils.

6. A system as in claim 4, wherein said processing circuitry causes said transmitter coils to emulate coils that are parallel to or perpendicular with the formation boundaries.

7. An induction logging system for measuring characteristics of formations through which a wellbore has been drilled by inducing eddy currents in a formation, comprising:
   a logging sonde, including a transmitter array for transmitting first signals and a receiver array for receiving second signals;
   processing circuitry coupled to said transmitter array and to said receiver array;
   wherein said processing circuitry electrically rotates said transmitter array in a direction defined by an inverse rotation matrix ($R^{-1}$) to steer the eddy currents in a direction that is parallel or perpendicular to formation boundaries, and wherein signals received by said receiver array are conditioned by a rotation matrix (R).

8. The induction logging system of claim 1, wherein system includes a pulsed mode, said signals transmitted by said transmitter array and received by said receiver array while in said puled mode.

9. The induction logging system of claim 1, wherein said induction logging system is a wireline logging system.

10. A system as in claim 1, wherein said receiver array comprises an orthogonally wound triad of coils.

11. A system as in claim 1, wherein said logging sonde includes a second receiver array.

12. A system as in claim 1, wherein said induction logging sonde produces logs devoid of horns.

13. A system as in claim 3, wherein said induction logging sonde produces logs sensitive to electrical anisotropy.

14. A method for steering a transmitter array in a logging tool to produce a directional induction current, comprising the steps of:
   determining a strike angle β at which the logging tool intersects the bedding plane;
   determining a dip angle α for the bedding plane;
   electrically rotating the transmitter array to produce the induction current in a direction that is either parallel or perpendicular to the bedding plane.

15. A method as in claim 14, wherein the transmitter array is rotated by the strike and dip angles.

16. A method as in claim 14, wherein the step of electrically rotating the transmitter array includes the steps of:
   establishing a coordinate system for the logging tool relative to standard inclination hardware;
   rotating the coordinate system by the strike angle β; and
   rotating the coordinate system by the dip angle α to coincide with the coordinate system of the bedding plane.

17. A method as in claim 14, wherein the step of determining the dip and strike angles α and β, respectively, includes the steps of:
   pulsing the $T_z$ transmitter;
   measuring the $T_zR_x$ and $T_zR_y$ coupling;
   determining the strike angle β by:

$$\beta = \tan^{-1} = \frac{(T_z R_y)}{(T_z R_x)}$$

pulsing the $T_x$ transmitter;
   measuring the $T_xR_y$ coupling;
   determining the dip angle α by:

$$\alpha = \tan^{-1}\sqrt{\left[\frac{(T_x R_y)}{(T_z R_y)}\right]^2 + \left[\frac{(T_z R_y)}{(T_z R_x)}\right]^2}$$

18. A method as in claim 14, wherein the transmitter array is driven with an inverse rotation matrix ($R^{-1}$) according to the following steps:
   applying a gain of $-\sin\alpha$ to the $T_x$ transmitter;
   applying a gain of $\cos\alpha$ to the $T_z$ transmitter.

19. A method as in claim 18, wherein the rotation matrix relates the coordinate system of the induction tool with the coordinate system of the bedding plane.

20. A method as in claim 19, further comprising the step of measuring a response at a receiver array.

21. A method as in claim 20, wherein the response at the receiver array is conditioned by the rotation matrix (R) according to the following steps:
   applying a gain of $\sin\alpha \cos\beta$ to the $R_x$ receiver;
   applying a gain of $\sin\alpha \sin\beta$ to the $R_y$ receiver;
   applying a gain of $\cos\alpha$ to the $R_z$ receiver;
   summing all of the receiver signals;

applying appropriate correction to account for coupling factor for specified orientation.

22. A method as in claim 21, wherein only the response reflecting a magnetic field in a z direction is retained to account for misalignment of magnetic moments of the transmitter and receiver arrays relative to the bed boundaries.

23. A method as in claim 14, wherein the transmitter array is driven with an inverse rotation matrix ($R^{-1}$) according to the following steps:

applying a gain of $\cos \alpha \cos \beta$ to the $T_x$ transmitter;

applying a gain of $-\sin \beta$ to the $T_y$ transmitter;

applying a gain of $\sin \alpha \cos \beta$ to the $T_z$ transmitter.

24. A method as in claim 19, further comprising the step of measuring a response at a receiver array.

25. A method as in claim 24, wherein the response at the receiver array is conditioned by the rotation matrix (R) according to the following steps:

applying a gain of $\cos \alpha \cos \beta$ to the $R_x$ receiver;

applying a gain of $\cos \alpha \sin \beta$ to the $R_y$ receiver;

applying a gain of $-\sin \alpha$ to the $R_z$ receiver;

summing all of the receiver signals;

applying appropriate correction to account for coupling factor for specified orientation.

26. A method as in claim 25, wherein only the response reflecting a magnetic field in an x direction is retained to account for misalignment of magnetic moments of the transmitter and receiver arrays relative to the bed boundaries.

27. The method of claim 14, further comprising:

measuring a response at a receiver array, wherein said receiver array is conditioned so that the receiver array stays in parallel with the rotated transmitter array.

28. The method of claim 14, wherein determining said dip angle uses measurements taken during a pulsed mode.

29. A method as in claim 14 wherein said logging tool is a wireline tool.

* * * * *